Nov. 22, 1938.　　　　　H. BUSCH　　　　　2,137,750
PNEUMATIC CONTROL VALVE
Filed Jan. 11, 1936
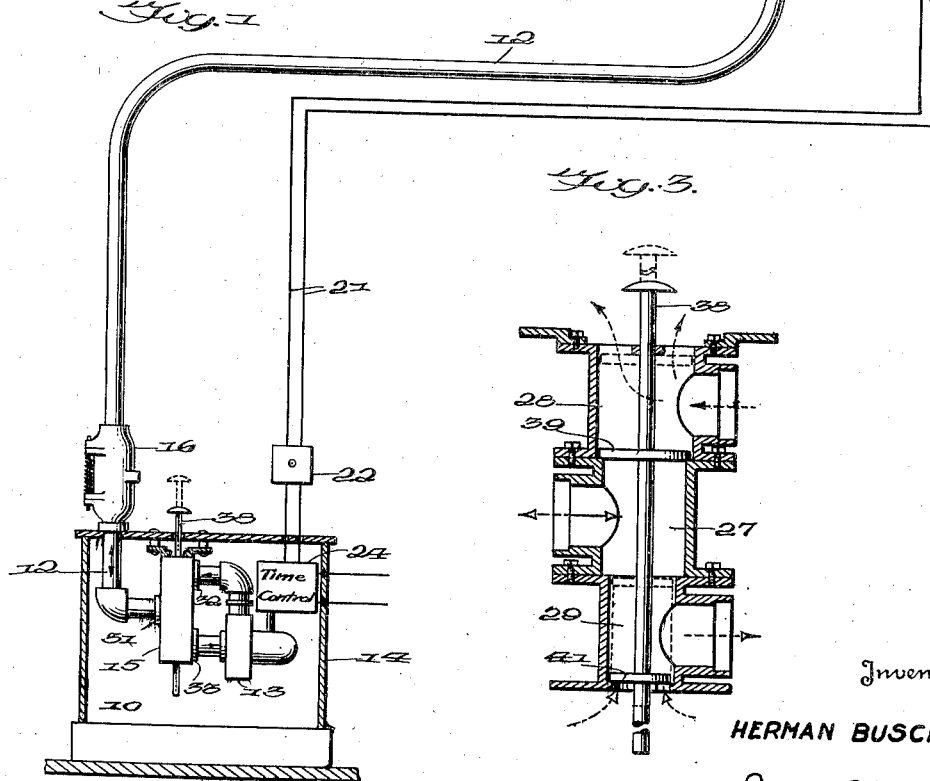
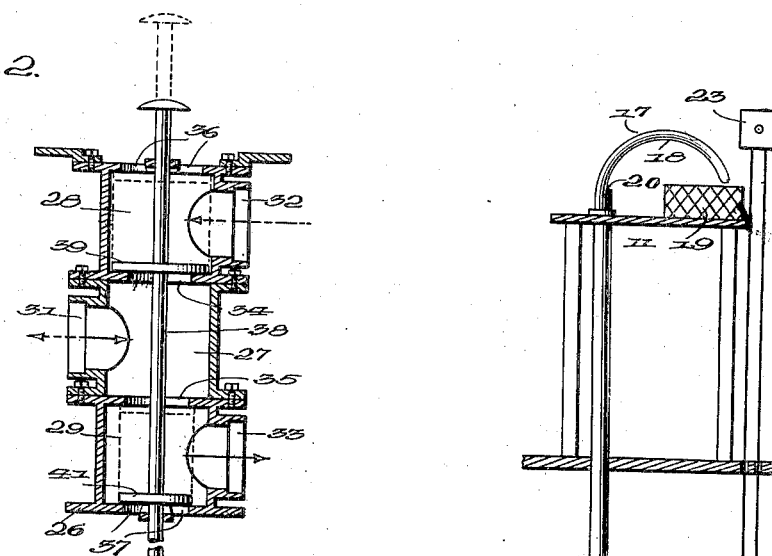
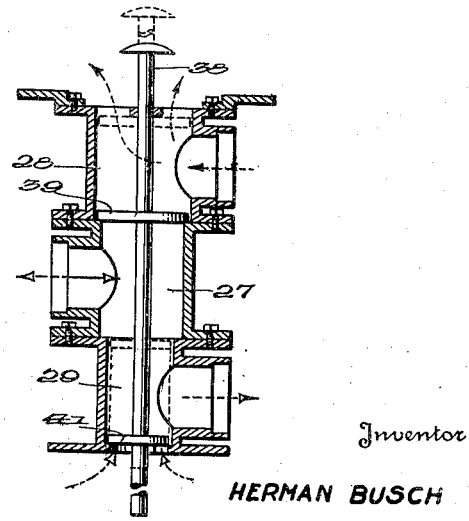
Inventor
HERMAN BUSCH
By Jas. C. Britt
Attorney Patented Nov. 22, 1938

2,137,750

UNITED STATES PATENT OFFICE 2,137,750

PNEUMATIC CONTROL VALVE

Herman Busch, Long Island City, N. Y., assignor to Airmatic Systems, Inc., New York, N. Y., a corporation of New York Application January 11, 1936, Serial No. 58,739

5 Claims. (Cl. 243—7)

This invention relates to control valves and has for its principal object the provision of a control valve in which fluid pressure in the valve casing accompanying a condition of flow of fluid therethrough is relied upon for holding the valve in adjusted position so long as flow continues.

The invention is particularly adaptable to use in pneumatic conveyor systems. While it is clear that it may be used in many other types of apparatus, it will be described particularly as applied to a pneumatic conveyor system having a single trunk line through which it is desired to convey material in both directions. In this use the valve is adapted to reverse the flow of motive fluid.

A most common type single trunk line pneumatic conveyor system is what is sometimes referred to as a push-pull cash carrier system and used between two points where the use is infrequent and a simple inexpensive arrangement is desired. In this type of installation a single carrier tube is disposed to connect a main station with an out station with means at both stations for sending and receiving. Where there is only one or just a few lines running out from the main station, it is customary to provide an individual unit blower for each line which, in order to conserve power expenditure, is operated only for the period of transmission. Means is provided for starting and stopping the blower, usually a starting button located at each station and a timing device for stopping the blower after sufficient time has elapsed to accomplish transmission. Transmission is affected from the main station by placing the line in communication with the pressure side of the blower reversing the flow of the transmission fluid. To send again in the first mentioned direction, the original communication is reestablished.

An object of this invention is to provide a control valve which in its normal position establishes communication between the line and one fluid stream and in an adjusted position between the line and another fluid stream and which automatically returns to normal.

Another object is a valve which will return to normal at the cessation of fluid flow without outside pressure sensitive means.

Another object is to provide a valve in which in its normal position the forces produced by pressure incidental to fluid flow are counterbalanced or neutralized so that it may be readily adjusted from such position, while in the adjusted position these forces are balanced so that a net residual force acts to hold the valve in adjusted position.

A further object is to produce a valve in which all these features are incorporated in a structure having only one moving part or one group of parts moving as a single unit.

A still further object is to produce a valve biased toward one position and in which an unbalancing of the forces incidental to fluid flow when the valve is moved to the other position overcomes the biasing force and holds it in said other position.

Still another object is the production of a modified form of the valve in which biasing forces are absent but in which forces incidental to flow serve to hold it in either of its extreme positions after it has been adjusted or moved thereto.

These and other objects will be apparent from the following description taken together with the accompanying drawing in which:

Fig. 1 is a diagrammatic illustration of a pneumatic system embodying the invention;

Fig. 2 is a sectional view of the preferred embodiment of the invention; and,

Fig. 3 is a sectional view of a modified form of the invention.

Referring now to Fig. 1 of the drawing, a main station 10 is arranged in the usual manner to communicate with an out station 11 through a carrier tube line 12. A blower 13 at the main station provides the motive fluid. The blower may be housed in a cabinet 14 which is usually noise-proofed. Both the inlet or vacuum side and the outlet or pressure side of the blower are coupled to the housing of a control valve 15 illustrated in one form in Fig. 2 and another form in Fig. 3. The function of this valve, as fully described below, is to place either the vacuum or the pressure side of the blower in communication with the tube line 12.

At the main station carriers are inserted into the line for sending to the out station and removed as received from the out station through any suitable combined sending and receiving terminal such as terminal 16 disposed above cabinet 14. At the out station a suitable combined receiving and sending terminal 17 is provided. At this terminal the carriers are received by the curved deflector portion 18 which directs them into basket 19. They are sent by inserting them at the throat 20.

As already stated, this type of system is customarily installed where the service is light and infrequent. In this system one of the economies is the provision for operating the blower or power source only during the time required for actual transmission. This is accomplished by providing a starting circuit 21 closed at the main and out stations respectively by means such as push buttons 22 and 23. When a carrier is inserted at either station the corresponding button is operated to start the blower. Once started the blower is continued in operation by means of a time control 24, located in the blower cabinet 14, for a sufficient period to assure that the carrier has reached its destination.

In order to transmit in both directions through tube 12 the air or motive fluid must travel out from the blower for carriers going from the main to the out station and in toward the blower for carriers coming from the out to the main station. In other words, the flow of air must be reversed each time the direction of travel is changed. According to this invention a simple and rugged motive fluid reversing or control valve such as valve 15 is provided which may be operated in connection with a system having the above described blower control.

The preferred form of valve 15 (Figs. 1 and 2) comprises a casing 26 having a central chamber 27, an upper chamber 28 and a lower chamber 29. The central chamber 27 has an outlet 31 for connecting with the transmission tube 12. The upper chamber 28 connects through outlet 32 with the pressure side of the blower. The lower chamber connects through outlet 33 with the vacuum side of the blower.

The upper and lower chambers communicate with the central chamber through ports 34 and 35 respectively. They also communicate with the outside atmosphere respectively through ports 36 and 37. A stem 38 is disposed centrally of the casing 26 and arranged to reciprocate therein along a vertical line. Upper and lower discs or pistons 39 and 41 are mounted upon the stem in a spool valvelike arrangement and disposed so that as the stem is moved up or down disc 39 reciprocates in chamber 28 and disc 41 reciprocates in chamber 29 both from their full to their dotted line positions. Hereinafter the adjustment or movement of the parts will be referred to as adjustment or movement of the valve.

The operation of the valve itself and the manner in which it functions is as follows. In their lower or full line positions disc 39 covers port 34 and disc 41 covers port 37, permitting chamber 29 to communicate only with central chamber 27 while chamber 28 is in communication with the outside atmosphere. The weight of the moving parts may be relied upon to bias the valve to its lower position. On the other hand, the biasing means may be supplied by means of a spring or the like, particularly if it is desired to mount the valve so that the parts would reciprocate along a horizontal line. In this manner whenever the blower is operated without adjustment of the valve to its upper or outer position, suction is always applied to the transmission tube through port 31 placing chambers 27 and 29 under vacuum while chamber 28 is open to atmosphere. It is to be observed that the ports 34 and 37 have substantially the same effective area and therefore that the forces upon discs 39 and 41 due to vacuum tend to counterbalance each other and produce no residual force tending to move the valve. So long as conditions of vacuum continue gravity will act to hold the valve undisturbed in its lower position. The particular advantage of having parts 34 and 37 the same size is that at the start in its upward movement, while the blower is operating, it is necessary to overcome the force of gravity alone. Once in motion the valve may be easily continued to its new position against any unbalanced forces which may develop.

It should be pointed out here that substantially the same effect would be produced and the same conditions hold in this form of the valve if the lower chamber as well as the upper chamber were subject to a pressure flow. This would be true so long as ports 34 and 37 were the same size or so long as substantially the same effective area of the two discs were subjected to the pressure incidental to a pressure flow of fluid. In such a case the valve would be operative as a fluid flow interchanging device.

Whenever the valve is manually or otherwise adjusted to its upper position, port 35 is closed by disc 41 and ports 37 opened while ports 36 are closed by disc 39 and port 34 opened, so that when the blower is operated chambers 27 and 28 are placed under pressure and chamber 29 opened to atmosphere. Since disc 39 is appreciably larger than disc 41, the force of the pressure upward toward ports 36 is greater than the pressure downward toward ports 37. The resultant is a force upward which exists and continues as long as the blower continues or so long as an air stream under pressure continues to flow through the valve.

The system according to Figs. 1 and 2 operates to transmit carriers as follows. Normally when the system is not in operation, the parts are in the solid line position illustrated with the vacuum side of the blower 13 connected to the transmission line 12. When it is desired to send from station 11, a carrier is introduced into the throat 20 and the starting circuit 21 closed by pushing button 23. The blower starts and continues for a period of time determined by the time control. This period is of sufficient length to assure that the carrier under ordinary conditions has reached its destination. The carrier arrives at terminal 16 and is removed. At the end of the aforesaid period of time the blower stops and remains idle until it is again desired to transmit. It is to be noted that the valve parts have remained undisturbed and that the system is in its normal condition of readiness for transmission from the out station 11.

When it is desired to send from the main to the out station, a carrier is inserted in terminal 16, the door is closed, the button 22 pushed starting the blower, and stem 38 raised manually or otherwise until the blower is running. Referring to Fig. 2, the discs 39 and 41 are now in their dotted line positions. This connects the pressure side of the blower with the transmission tube 12 through port 34. Pressure now acts downwardly upon the small disc 41 and at the same time upwardly with substantially the same force per unit area upon the large disc 39. The areas of the discs are so proportioned relative to each other and to the pressure that the resultant upward force is sufficient under the usual operating conditions to overcome, with the desired margin of safety, the biasing force, whether it be gravity, as in the illustration, or some other form, and hold the valve parts upward so long as the blower continues in operation. When the time control stops the blower, the air pressure on discs 39 and 41 ceases terminating this force, the biasing force bringing the valve back to its normal position preparing the system for transmission from the out to the home station as already described. Either of the operations may be repeated as many times in succession or alternately by a proper manipulation of the starting buttons and valve.

Another form of the valve is shown in Fig. 3 taken in connection with Fig. 1, in which similar parts are given the same reference characters as in Figs. 1 and 2. This second form of the valve can best be understood by comparing it with the first described form.

It differs mainly in that the upper and lower chambers 28 and 29 correspond in diameter to the upper and lower discs 39 and 41 respectively. Likewise ports 34 and 35, instead of being the same size correspond to the upper and lower discs. The control chamber 27 is formed with a diameter intermediate the two.

In operation the differential pressures set up when the stem 38 and discs are raised are substantially the same as in the first form and act in substantially the same way. On the other hand, there is a definite differential pressure action upon the discs when in their lower position where the valve connects the suction or vacuum side of the blower with the line. Thereupon an upward pressure is exerted on disc 41 and a downward pressure on disc 39. The latter disc having a larger area, the net resultant force is downward and tends to hold the valve firmly in this position.

With the type of valve just described, if for any reason it became desirable to eliminate the automatic restoration of the system for sending from the out station, the valve may be disposed with the stem 38 in horizontal position in order to eliminate the gravity bias or the bias may be eliminated by some other means. In this manner the valve may be moved into position for sending the air in the proper direction and it will remain in this position until it is moved again. In either direction of air flow the valve will be held firmly in the adjusted position. When the air flow ceases, it remains undisturbed until it is moved to the opposite position.

There are many other uses as already suggested to which this type of control valve may be put. Furthermore it is to be understood that the valve may be used in other systems, such for instance, as systems having separate sources of air or fluid flow.

While this invention has been shown and described in but two forms it will be readily understood by those skilled in the art that it may be embodied in various other forms and modifications without departing from the spirit thereof and it is desired therefore that only such limitations shall be placed thereon as are imposed by the prior art or set forth in the appended claims.

What I claim is:

1. In a pneumatic carrier dispatch system a single pneumatic dispatch tube connecting a main station to an out station, an air valve having a housing connected in said tube, air lines connected to said housing in which oposite conditions of flow may be set up, an air flow chamber in said housing, a valve in said chamber, said valve being normally positioned to cause the air to flow from the out to the main station and arranged to be moved to air reversing position for reversing the flow of air through said tube for causing the air to flow from the main to the out station, said valve being biased in a direction tending to return the valve to normal position, an abutment in said air flow chamber movable with the valve element, said abutment disposed to be acted upon by the air stream through said tube while the valve is in air reversing position holding the valve in said position only for a period commensurate with the duration of said reversed air flow.

2. An air flow reversing valve for a system such as a pneumatic conveyor line having means for producing periodically an air flow through said line, said valve embodying a reciprocating spool type element movable into opposite flow directing positions for reversing the flow of air, the heads of the spool element of said valve having different areas whereby an unbalanced force produced by the pressure incidental to flow through the line acts to hold the valve in the position into which it has been moved.

3. An air flow reversing valve for connecting a primary line alternately with one of two secondary air lines in which air may be caused to flow in an incoming direction in the one and an outgoing direction in the other, means to start and stop the air flow in said lines, said valve having a housing with connections for the primary air line and secondary air lines, and a spool type valve element arranged to reciprocate between two positions in said housing for placing the one and the other of the secondary air lines alternately in communication with the primary line, said valve element being biased toward one of said positions, the heads of said spool element having a net differential area the pressure upon which acts during one of said line connections in opposition to the bias with a force sufficient to overcome the same so that in making said connections the valve may be adjusted into the position opposite to the one toward which it is biased and remain stable therein as long as the air continues to flow but return to the biased position when the air flow ceases.

4. A fluid flow reversing valve for a system such as a pneumatic conveyor line, said valve having a housing embodying an upper chamber through which an incoming fluid flows, a lower chamber through which an outgoing fluid flows, and central chamber through which fluid flows to and from the conveyor line, said upper chamber being provided with upper and lower ports, communicating respectively with the atmosphere and said central chamber, said lower chamber being also provided with upper and lower ports communicating with the central chamber and the atmosphere respectively, all of said ports being in alinement, a reciprocative stem in said housing, a disc in each of said upper and lower chambers respectively secured to said stem and arranged to be raised by the same from a position covering the lower ports of the respective chambers, placing the central chamber in communication with the outgoing fluid flow to a position covering the upper ports thereof, placing the central chamber in communication with the incoming fluid flow, the disc for the upper chamber having a larger area than the disc for the lower, the area of said ports being proportioned so that in the lower position of the discs substantially the same area of the two discs is exposed to the pressure incidental to fluid flow, while in the upper position thereof a larger area of the upper disc is exposed, whereby the discs are held in their upward position by a residual force produced by pressure incidental to the flow of the incoming fluid while in their downward position they are held by the force of gravity alone.

5. A fluid flow reversing valve for a system such as a pneumatic conveyor line, said valve having a housing embodying a first outer chamber through which an incoming fluid flows, a second outer chamber through which an outgoing fluid flows, and central chamber through which fluid flows to and from the conveyor line, said first outer chamber being provided with outer and inner ports, communicating respectively with the atmosphere and said central chamber, said second outer chamber being provided with inner and outer ports communicating with the central chamber and the atmosphere respectively, all of said ports being in alinement, a reciprocative stem in said housing, a disc in each of said first and second outer chambers respectively, secured to said stem and arranged to be moved by the same between a position covering the inner port of the first chamber and the outer port of the second placing the central chamber in communication with the outgoing fluid and a position covering the outer port of the first chamber and the inner port of the second, placing the central chamber in communication with the incoming fluid flow, the disc for the first outer chamber having a larger area than the disc for the second, the area of said ports being proportional to the size of said discs so that in either position of the latter a substantially larger area of the first mentioned disc is exposed whereby the discs are held in either of said port covering positions by a residual force produced by pressure incidental to the flow of the fluid in either direction.

HERMAN BUSCH.